(12) United States Patent
Gibbs et al.

(10) Patent No.: US 11,079,917 B2
(45) Date of Patent: Aug. 3, 2021

(54) INSIGHTS PANEL FOR PRESENTATION SLIDES IN A CLOUD COLLABORATION PLATFORM

(71) Applicant: salesforce.com, inc., San Francisco, CA (US)

(72) Inventors: Kevin Gibbs, San Francisco, CA (US); Drew Hamlin, San Francisco, CA (US); Chris de la Iglesia, Oakland, CA (US); Diana Berlin, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 355 days.

(21) Appl. No.: 16/263,851

(22) Filed: Jan. 31, 2019

(65) Prior Publication Data

US 2020/0090125 A1 Mar. 19, 2020

Related U.S. Application Data (60) Provisional application No. 62/733,075, filed on Sep. 18, 2018, provisional application No. 62/735,746, (Continued)

(51) Int. Cl.
*G06F 3/0484* (2013.01)
*G06F 3/0486* (2013.01)
(Continued)

(52) U.S. Cl.
CPC ........ *G06F 3/04847* (2013.01); *G06F 3/0486* (2013.01); *G06F 3/04883* (2013.01);
(Continued)

(58) Field of Classification Search
None
See application file for complete search history.

(56) References Cited

U.S. PATENT DOCUMENTS

2002/0109712 A1* 8/2002 Yacovone ............... G06F 16/41
715/732
2010/0257456 A1* 10/2010 Lieb ....................... H04L 67/02
715/741

(Continued)

OTHER PUBLICATIONS

Extended European Search Report issued in European Application No. EP19197677.8, dated Dec. 17, 2019 (10 pages).

(Continued)

*Primary Examiner* — Dennis W Ruhl
(74) *Attorney, Agent, or Firm* — Sterne, Kessler, Goldstein & Fox P.L.L.C.

(57) ABSTRACT

Disclosed herein are system, method, and computer program product embodiments for an insights panel for presentations slides in a cloud collaboration platform. An embodiment operates by loading a presentation and an account associated with the presentation, determining view status for the slide, comment status for the slide, total number of comments on the presentation, and percentage of engagement and displaying the presentation with an insights tab that includes this information. The creator of a presentation may view a comprehensive summary of edits made to the presentation, comments made to the presentation, and views of the presentation; see the users that were given access to the slide presentation and a level of engagement on an individualized basis; and benefit by seeing a level of engagement among the users over time.

20 Claims, 4 Drawing Sheets

Related U.S. Application Data filed on Sep. 24, 2018, provisional application No. 62/735,731, filed on Sep. 24, 2018.

(51) Int. Cl.

| | | |
|---|---|---|
| *H04L 29/06* | (2006.01) | |
| *G06F 3/0488* | (2013.01) | |
| *G06F 40/106* | (2020.01) | |
| *G06F 16/2457* | (2019.01) | |
| *G06F 16/176* | (2019.01) | |
| *G06Q 10/10* | (2012.01) | |
| *H04L 29/08* | (2006.01) | |
| *G06F 11/34* | (2006.01) | |
| *G06F 3/14* | (2006.01) | |
| *G06F 40/169* | (2020.01) | |

(52) U.S. Cl.
CPC ............ *G06F 11/34* (2013.01); *G06F 16/176* (2019.01); *G06F 16/24573* (2019.01); *G06F 40/106* (2020.01); *G06Q 10/101* (2013.01); *H04L 65/4015* (2013.01); *H04L 67/22* (2013.01); *G06F 3/1454* (2013.01); *G06F 40/169* (2020.01)

(56) References Cited

U.S. PATENT DOCUMENTS

| | | | | |
|---|---|---|---|---|
| 2014/0053071 | A1* | 2/2014 | Penner | G06Q 10/10 |
| | | | | 715/732 |
| 2015/0206446 | A1* | 7/2015 | Gupta | G09B 5/08 |
| | | | | 434/362 |
| 2016/0073054 | A1* | 3/2016 | Balasaygun | H04L 12/1813 |
| | | | | 348/14.08 |

OTHER PUBLICATIONS

Reach, Catherine Sanders, "Google Drive Collaboration: It's a Document Party!", Attorney at Work, Mar. 18, 2019, available at: http://www.attorneyatwork.com/google-drive-collaboration-document-party-multiple-editors/ (5 pages).

Keeler, Alice, "Direct Comment to Someone in Google Docs—Teacher Tech", Apr. 22, 2016, available at: https://alicekeeler.com/2014/09/10/direct-comment-to-someone-in-google-docs/ (5 pages).

"Make Google Slides presentations interactive | Poll Everywhere", Nov. 5 2016, available at: https://www.polleverywhere.com/app/google-slides (4 pages).

\* cited by examiner

INSIGHTS PANEL FOR PRESENTATION SLIDES IN A CLOUD COLLABORATION PLATFORM

CROSS-REFERENCE TO RELATED APPLICATIONS

This application claims the benefit of U.S. Provisional Patent Application 62/733,075, by Li, et al., "User Experience Improvements For The Development Of Presentation Slides In A Cloud Collaboration Platform," filed Sep. 18, 2018, U.S. Provisional Patent Application 62/735,746, by Chung, et al., "Reader Mode and Insights for Presentation Slides in a Cloud Collaboration Platform," filed Sep. 24, 2018, and U.S. Provisional Patent Application 62/735,731, by Chung, et al., "Slide Grid Snapping and Comment Anywhere For Presentation Slides In a Cloud Collaboration Platform," filed Sep. 24, 2018, which are hereby incorporated by reference in their entirety.

This application is related to U.S. patent application Ser. No. 16/263,860 titled "Slide Grid Snapping For Presentation Slides In A Cloud Collaboration Platform," filed herewith and U.S. patent application Ser. No. 16/264,041 titled "Reader Mode For Presentation Slides In A Cloud Collaboration Platform," filed herewith, both of which are herein incorporated by reference in their entireties.

BACKGROUND

A cloud collaboration platform may allow users to author various forms of content, for example, documents, text files, spreadsheets, presentation slides, and other files. The cloud collaboration platform may furnish a litany of word processing tools to these authors in order to facilitate document creation and editing. An author may also communicate with other users on the cloud collaboration platform, share documents, and receive comments, suggestions, edits, and other feedback. By integrating communication tools with word processor tools, a cloud collaboration platform may enhance workflows, save time, and promote teamwork.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for improving users' experiences within a cloud collaboration platform.

A cloud collaboration platform may allow multiple users to work together to design, write, implement, edit, and finalize various forms of content. Such content may be documents, text files, spreadsheets, presentation slides, videos, audio files, or any other suitable types of files. A cloud collaboration platform may include word processing and editing tools to create, compose, draft, and revise these files. A cloud collaboration platform may include a versioning system or methodology to dynamically track changes over time.

A cloud collaboration platform may incorporate various forms of permissions and access controls. For example, a cloud collaboration platform may allow users to set access permissions to stored files. In an embodiment, an author may control whether other users may edit a document or just view the document. An author may set access permissions on a per-user, i.e., grant access to only one user or a subset of users, and per-document basis, i.e., configure a different set of access permissions for each file in the cloud collaboration platform.

A cloud collaboration platform may encourage communication and collaboration among users by allowing users to send other users messages, post to a message board, include comments in document or file, and engage in other suitable communicative activities. Some comments in a cloud collaboration platform may be viewable by all users while other comments may be user-specific and only viewable by a subset of the users. Comments may tag, link, or reference other users or other documents. Comments may include feedback stickers, i.e., prompts via which users can receive information from other users (e.g., conduct polls, receive text answers to questions, etc.).

A cloud collaboration platform may include presentation slides among the documents that users may create, edit, and finalize. Users may collaborate to build presentation content. By integrating a variety of word processing and communication tools into the slide design process, users may save time that would otherwise be lost in meetings or spent resorting to third-party communication or editing tools. For example, a user may add a new slide to a presentation and edit the slide directly in the cloud collaboration platform. Editing capabilities may include adding text, images, audio/video components, selecting colors, and many other suitable actions. A second user may make further edits, add comments to the slide presentation, raise questions, and provide additional feedback.

When a creator shares a presentation with other users in the cloud collaboration platform, the creator may benefit from receiving details about the extent and manner of other users' engagement with the presentation. For example, the creator may want to view in a comprehensive summary aggregate totals of views, edits, and comments for the presentation. The creator may further aim to see users with access to the slide presentation and a level of engagement on an individualized basis, for example, a number of slides that the users viewed in the presentation, a number of minutes or other time measure of engagement with the presentation, a number of comments made by the users, and other information measuring the users' level of engagement. Finally, the creator may benefit by seeing a level of engagement among the users over time, for example, a trend summary across a 30-day period. Legacy solutions fail to provide these insights in a centralized, streamlined, and user-friendly fashion.

Accordingly, a need exists to provide insights into user engagement with a slide presentation in a cloud collaboration platform.

Figure 1:
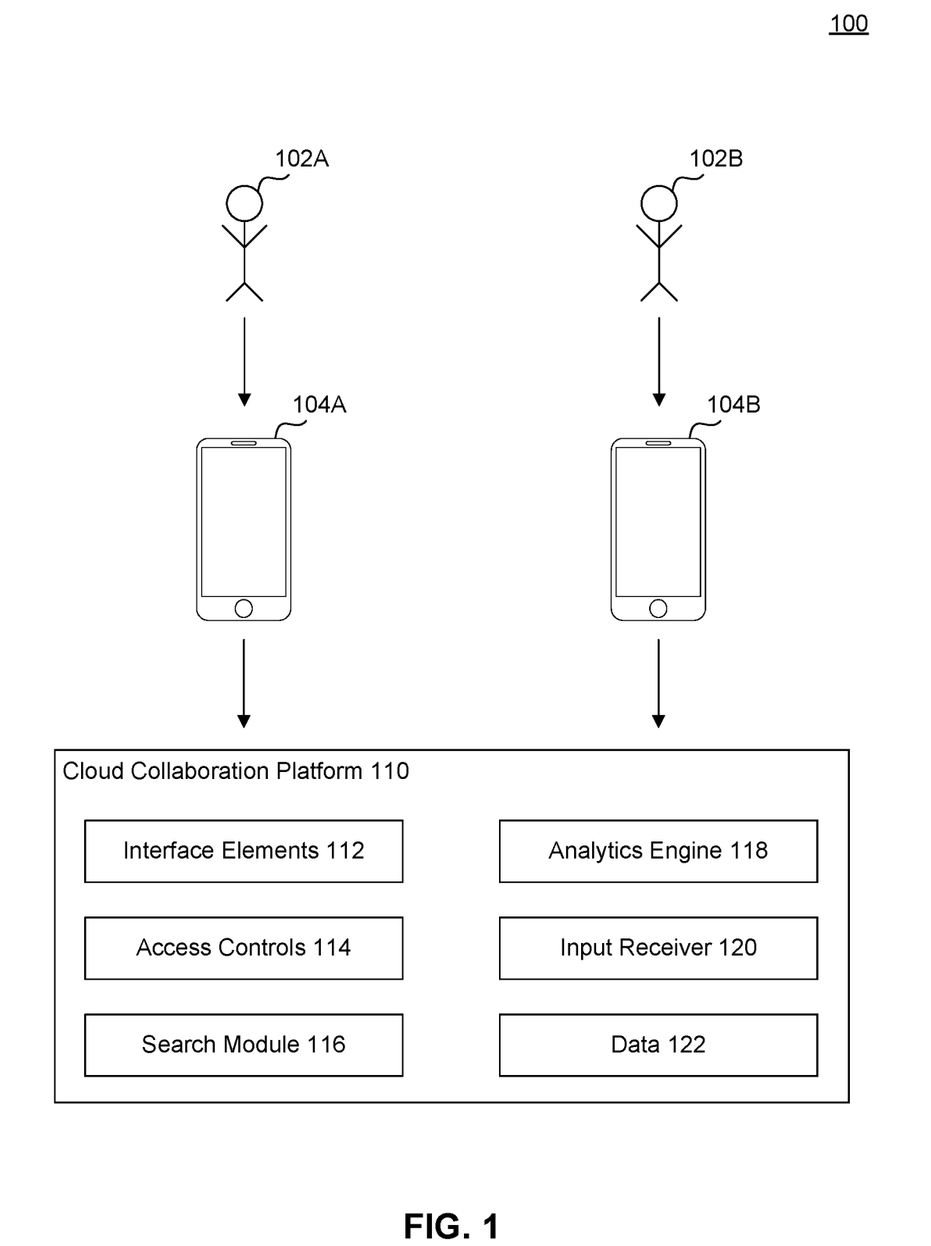
FIG. 1 is a schematic block diagram showing an example system including a cloud collaboration platform, according to some embodiments.

FIG. 1 is a schematic block diagram showing an example system 100 including a cloud collaboration platform, according to some embodiments. System 100 may include users 102, such as user 102A and user 102B, devices 104, such as device 104A and device 104B, and cloud collaboration platform 110. Cloud collaboration platform 110 may include interface elements 112, access controls 114, search module 116, analytics engine 118, input receiver 120, and data 122.

Users 102 may be individuals or entities using a cloud collaboration platform or other suitable software application. Users 102 may members of a business, organization, or other suitable group using the cloud collaboration platform to perform tasks related to that business or organization. Users 102 may be individuals using a cloud collaboration platform for personal pursuits. Users 102 may be human beings, but users 102 may also be artificial intelligence constructs. Users 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Devices 104 may be personal digital assistants, desktop workstations, laptops or notebook computers, netbooks, tablets, smart phones, mobile phones, smart watches or other wearables, appliances, part of the Internet-of-Things, and/or embedded systems, to name a few non-limiting examples, or any combination thereof. Although devices 104 are illustrated in the example of FIG. 1 as a single computer, one skilled in the art(s) will understand that devices 104 may represent two or more computers in communication with one another. Therefore, it will also be appreciated that any two or more components of system 100 may similarly be executed using some or all of the two or more computers in communication with one another.

Cloud collaboration platform 110 may include interface elements 112, access controls 114, search module 116, analytics engine 118, input receiver 120, and data 122. Cloud collaboration platform 110 may combine word processing tools with communication tools in order to allow enhance teamwork and collaboration among multiple users in building, editing, and finalizing text files, documents, spreadsheets, presentation slides, and other files.

Interface elements 112 may provide components that allow cloud collaboration platform 110 to render a user interface for view by users 102 on devices 104. Interface elements 112 may include a JavaScript library or other user interface library to facilitate dynamic interactions between users 102 and cloud collaboration platform 110. Interface elements 112 may include a development toolkit facilitating the building and deployment of HTML5 applications or mobile applications. Interface elements 112 may include appropriate stylesheets and design formats to shape, for example, the display format of data retrieved by cloud collaboration platform 110.

Access controls 114 may control permissions and access to and/or within cloud collaboration platform 110. Access controls 114 may authorize connections using username/password combinations. In some embodiments, access controls 114 may employ an alternate authentication methodology, such as two-factor authentication, token authentication, biometric data, etc., to identify, authorize, encrypt, and account for user connections. The level of access granted to a user may vary depending on the user type; therefore, the functionality provided to users may differ depending on the individual user accessing the system. Access controls 114 may additionally track access to files among users 102. For example, access controls 114 may store information indicating that a particular user may access a particular document and an access level.

Search module 116 may allow users 102 to search for other users, documents, files, or data items within cloud collaboration platform 110. Search module 116 may employ a suitable search tool or indicator to receive an input from users 102. Search module 116 may use an appropriate cataloging methodology to store previous messages, comments, edits, etc. and retrieve appropriate information via full-text searches. Search module 116 may promote the use of "@" or "#" to retrieve appropriate documents or users that satisfy the searches from users 102.

Analytics engine 118 may perform advanced analysis of information contained in files and user comments to provide additional insights into the collaborative processes. For example, analytics engine 118 may review information stored in data 122 to determine a level of engagement among users 102 with a particular slide presentation or among several slide presentations. Such information analyzed may include the last time of activity for users, the amount of comments provided, the amount of presentation slides viewed, etc. Analytics engine 118 may provide derived analytical data to an insights tab or interface, as described below with reference to FIGS. 2 and 9. Analytics engine 118 may provide analytical data in the insights tab to users 102 using interface elements 112.

Input receiver 120 may receive and process inputs from users 102 within cloud collaboration platform 110. Input receiver 120 may receive inputs from any suitable mechanism including: a mouse, a keyboard, stylus, input gesture, or other suitable mechanism for expressing a user intentions. User inputs may include entering text, drawing checkmarks, circles, squares, lines, and other geographic symbols, swiping, clicking, tapping, dragging, and other gestures. Input receiver may use interface elements 112 to display appropriate navigational buttons, input forms, and other HTML fields to facilitate interaction with cloud collaboration platform 110.

Data 122 may be a variety of stored information relevant to the documents, messages, comments, and other information in cloud collaboration platform 110. Data 122 may be housed or stored in a relational database, a NoSQL database or other horizontally scaling database, a digital ledger technology or blockchain, or any other suitable storage mechanism. For instance, cloud collaboration platform 110 may harness any commercially available database management system to store and retrieve data 122. In an embodiment, data 122 may be stored in a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, cloud collaboration platform 110 deploys a hard-disk interface, such as ATA, SATA, SCSI, SAS, and/or fibre for interfacing with storage mediums housing data 122.

Figure 2:
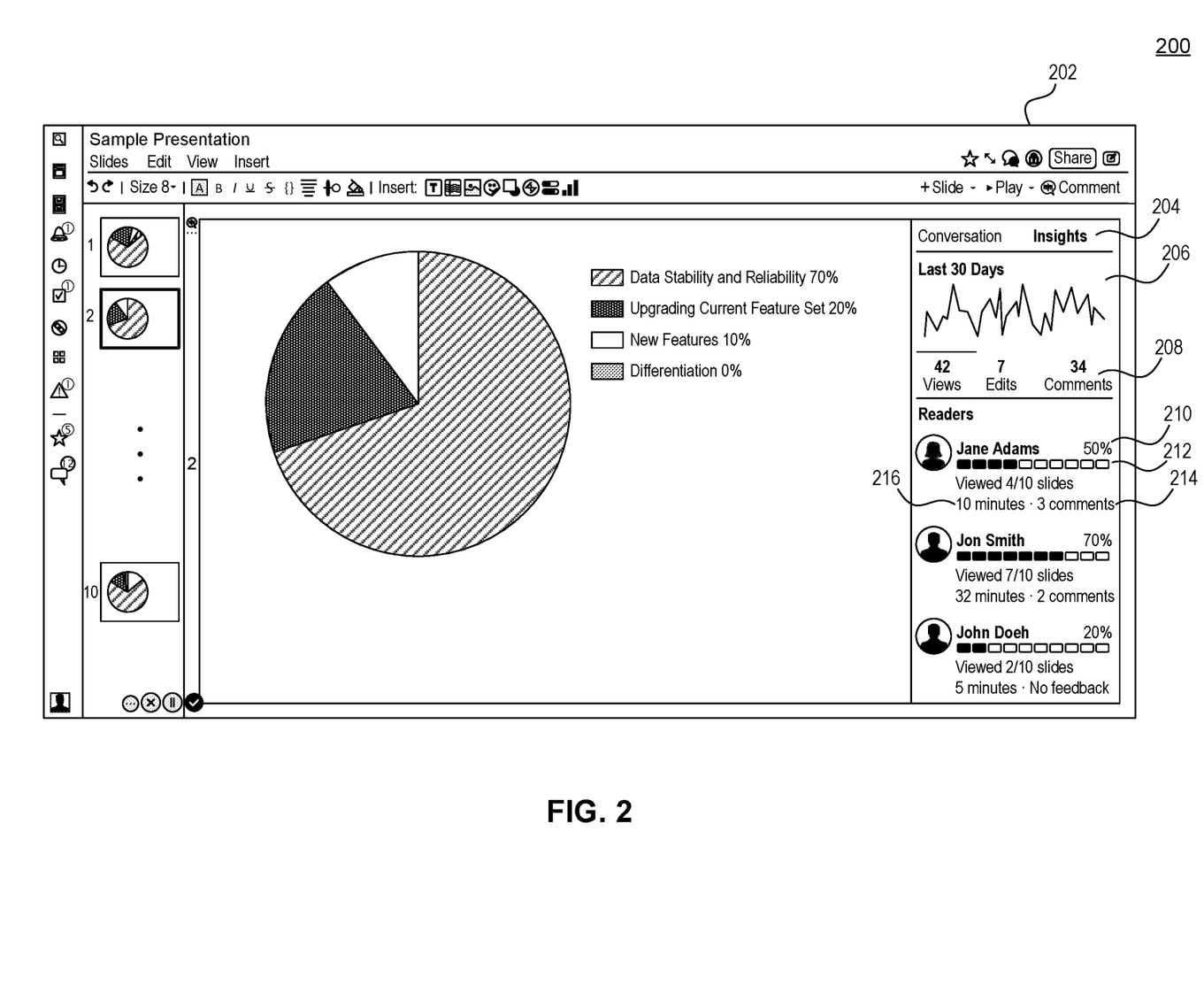
FIG. 2 is an example screen display of a cloud collaboration platform for presentation slides in editor mode, according to some embodiments.

FIG. 2 is an example of a screen display 200 in a cloud collaboration platform for presentation slides in an editor mode, according to some embodiments. The screen display provided in FIG. 2 is merely exemplary, and one skilled in the relevant art(s) will appreciate that many approaches may be taken to provide a suitable screen display 200 in accordance with this disclosure.

Editor screen 202 may display a slide presentation for editing by users 102. Editor screen 202 may include tools to add slides, rearrange slides, and control the overall flow of the slide presentation. Editor screen 202 may provide tools to add text, images, audio/video components to a particular slide and position the elements appropriately. Edit screen 202 may allow users to select colors, change fonts, etc. Edit screen 202 may include commenting facilities, allowing users 102 to view their own comments and comments from other users 102. Editor screen may allow users 102 to scroll to other slides in a single view as opposed to displaying only one slide at a time.

Insights panel 204 may be displayed by cloud collaboration platform 110 within, alongside, near-to, otherwise in association with editor screen 202 to provide a variety of analytical data to users 102. Insights panel 204 may reflect a level of user engagement with the slide presentation. For example, insights panel 204 may include the last time of activity for users, the number of comments provided, the amount of presentation slides viewed, etc. as part of a summary display and on a per-user basis. Insights panel 204 may employ analytics engine 118 to derive additional analysis based on the underlying data and display this for users 102. This may, in some embodiments, may include trend line charts for slides that include further conclusions about user interaction with the presentation, for example, a visual representation of interactions over time in a line graph, bar graph, pie chart, etc.

Trend line 206 may be provided within insights panel 204 by cloud collaboration platform 110 to provide an indication to a creator, e.g., user 102A, of other users' engagement with insights panel 204. Trend line 206 may be derived using analytics engine 118 and/or search module 116. In one embodiment, trend line 206 may display a quantitative line indicating a derived level of user engagement across the last 30 days or other suitable time period. In such an embodiment, the level of user engagement may reflect the number of user views, the number of user edits, the number of user comments, or some combination thereof and/or include other quantitative measures regarding user engagement with the presentation. In other embodiments, trend line 206 may not be a line graph but a pie chart, bar graph, or other quantitative representation of user engagement. Trend line 206 may consider the full set of users with access to the presentation or a subset thereof, and, in some embodiments, may include filtering or grouping mechanisms to further refine the results.

Summaries 208 may provide information about all relevant accounts' interaction with the slide and/or presentation in some embodiments. In one embodiment, summaries 208 may display a number of views of the present slide, the number of edits done on the slide, and the number of comments attached to the slide. In another embodiment, summaries 208 may display similar information with respect to the presentation.

User engagement percentage 210 displays a quantitative measure of each user accounts engagement with the presentation. In one embodiment, user engagement percentage 210 may display a percentage derived by dividing the number of slides that a user viewed by the total number of slides in the presentation. However, other embodiments may calculate user engagement percentage 210 in other fashions, e.g., based on the number of comments or edits to the slides made by the user. In one embodiment, user engagement percentage 210 may display the amount of time user 102A spends in an active capacity on the slides as compared to total time logged into the cloud collaboration platform.

User slide engagement 212 may include a number of slides within a plurality of slides view by user 102A. In an embodiment, user slide engagement 212 may be represented as a line of rectangles, where the number of rectangles correspond to the number of slides in the presentation. In this embodiment, the rectangles (or other suitable visual representation of a slide) may be outlined, colored in, greyed out, or otherwise changed to represent the slides among the total slides in the presentation that the user may access. In the exemplary screen shot provided in FIG. 2, user 102A named "John Smith" viewed 7 of 10 slides in the presentation and the slides that this user viewed are denoted from among the total slides in the presentation.

Number of comments 214 may provide a total number of comments a user 102A made on slides within the plurality of slides, in some embodiments. In one embodiment, number of comments 214 may represent the number of comments made by a given user 102A on the presently viewed slide, but in another embodiment, number of comments 214 may represent the number of comments made by a given user 102A across all slides in the presentation.

Time of engagement 216 may provide the amount of time a user 102A spent viewing the slide in some embodiments. Time of engagement 216 may display the number of minutes that the user viewed the slides or another suitable time length indicator.

Taken together, insights panel 204 may allow the developer/creator of the presentation to gain further insights into what aspects of the slides and what content within the slides drew the attention of users 102.

Figure 3:
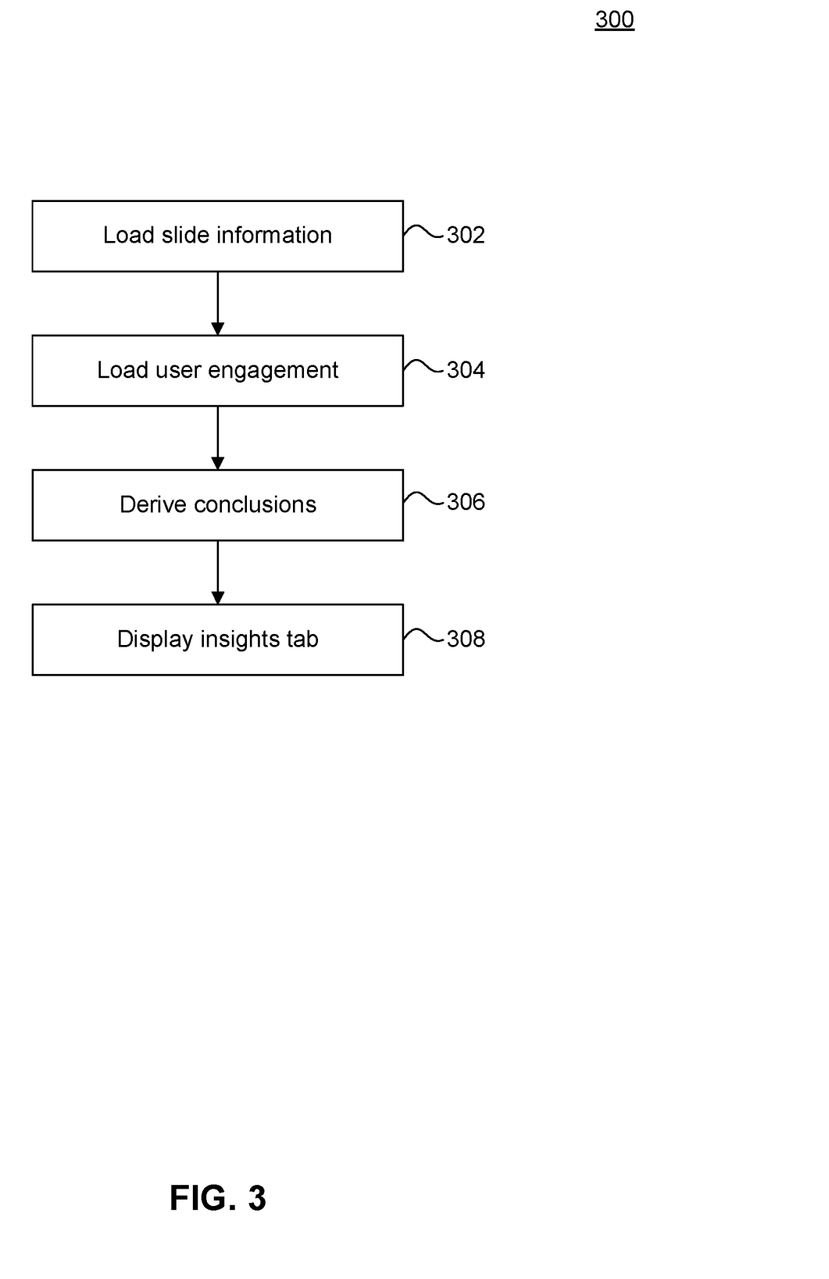
FIG. 3 is a flowchart illustrating a method of displaying an insights panel in a collaboration platform, according to some embodiments.

FIG. 3 illustrates a method 300 of displaying an insights panel in a cloud collaboration platform, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, cloud collaboration platform 110 may load the slide information for display in editor screen 202. Such information may include text, images, sound files, videos, etc. as well as detailed formatting and positional information for each of the elements. Cloud collaboration platform 110 may store such information in data 122 or retrieve the information from another suitable location.

In 304, cloud collaboration platform 110 may load user engagement information for display in insights panel 204. Such information may include comments, views, edits, and other forms of user engagement with the slide presentation. Cloud collaboration platform 110 may store such information in data 122 or retrieve the information from another suitable location.

In 306, cloud collaboration platform 110 may employ analytics engine 118 to perform advanced analysis and derive conclusions based on the slide information pulled in 702 and the user engagement information pulled in 304.

In 308, cloud collaboration platform 110 may render insights panel 204. Insights panel 204 may display the number of views, edits, and comments. Insights panel 204 may display information over a timeframe. In an embodiment, this timeframe may be configurable. Insights panel 204 may display particularized information across the editors and readers of the slide presentation. For example, insights panel 204 might display the last activity time for each user and a number of comments made by each user. Insights panel 204 may display a number of slides viewed by each user. Insights panel 204 may display a sign-off value, indicating that the user approved the document. Other suitable stored or derived information may be displayed in the rendered insights tab. Insights panel 204 may include trend line 206, summaries 208, user engagement percentage 210, user slide engagement 212, number of comments 214, and time of engagement 216 with reference to FIG. 2.

Figure 4:
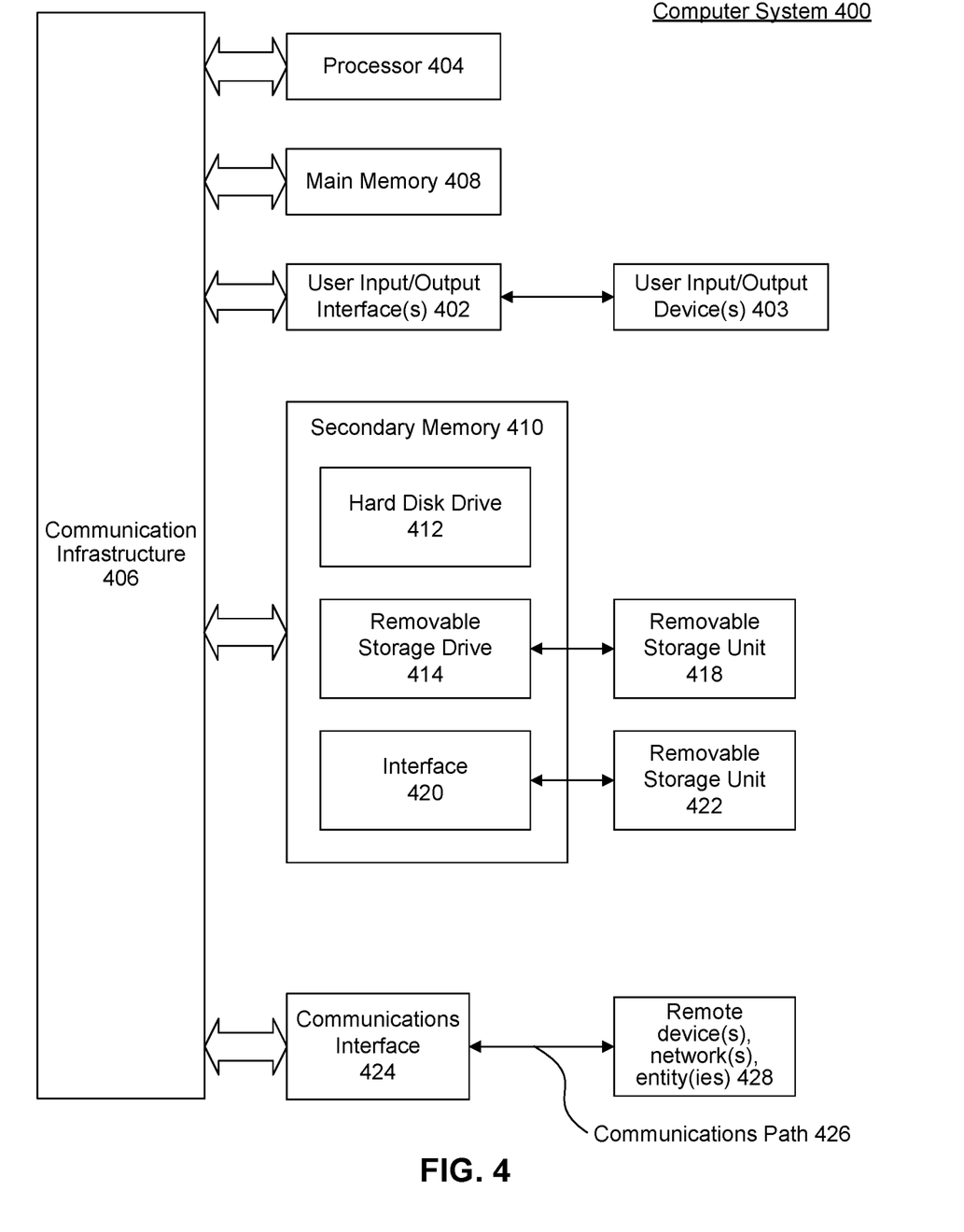
FIG. 4 is an example computer system useful for implementing various embodiments.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 1004 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    loading, by a cloud collaboration platform, a presentation and an account associated with the presentation, wherein the presentation comprises a slide, and wherein the slide comprises a content and an account comment;
    determining, by the cloud collaboration platform, a view status for the slide, a comment status for the slide, a total number of comments on the presentation, and a percentage of engagement, wherein the view status indicates that an account viewed the slide, wherein the comment status indicates that the account commented on the slide; and
    displaying, by the cloud collaboration platform, the presentation with an insights tab, wherein the insights tab displays the account, a thumbnail representation for the slide, the percentage of engagement, and a summary panel comprising a number of edits, wherein the number of edits is the cumulative total of edits made in the presentation, and wherein the thumbnail representation includes the view status and the comment status, and wherein the loading, determining, and displaying are performed by one or more computers.

2. The method of claim 1, further comprising:
    determining, by the cloud collaboration platform, a time spent viewing the presentation by the account; and
    displaying, by the cloud collaboration platform, the time spent viewing the presentation in association with the account in the insights tab.

3. The method of claim 1, further comprising:
    determining, by the cloud collaboration platform, a number of slides in the presentation viewed by the account; and
    displaying, by the cloud collaboration platform, the number of slides viewed with the account in the insights tab.

4. The method of claim 1, further comprising:
    determining, by the cloud collaboration platform, a last activity time for the account indicating the date and time that the account viewed the presentation; and
    displaying, by the cloud collaboration platform, the last activity time in association with the account in the insights tab.

5. The method of claim 1, further comprising:
    determining, by the cloud collaboration platform, a total number of comments for the account on the presentation; and
    displaying, by the cloud collaboration platform, the total number of comments in association with the account in the insights tab.

6. The method of claim 1, further comprising:
    displaying, by the cloud collaboration platform, a trend indicator in the insights tab, wherein the trend indicator provides in graphical form an indication of user engagement over a time period.

7. The method of claim 1, wherein the summary panel further comprises:
    a number of views and a number of comments,
    wherein the number of views is the cumulative total of views of the presentation,
    and
    wherein the number of comments is the cumulative total of comments entered in the presentation.

8. A system, comprising:
    a memory; and
    at least one processor coupled to the memory and configured to:
        load a presentation in a cloud collaboration platform and an account associated with the presentation, wherein the presentation comprises a slide, and wherein the slide comprises a content and an account comment;
        determine a view status for the slide, a comment status for the slide, a total number of comments on the presentation, and a percentage of engagement, wherein the view status indicates that an account viewed the slide, wherein the comment status indicates that the account commented on the slide; and display the presentation with an insights tab, wherein the insights tab displays the account, a thumbnail representation for the slide, the percentage of engagement, and a summary panel comprising a number of edits, wherein the number of edits is the cumulative total of edits made in the presentation, and wherein the thumbnail representation includes the view status and the comment status, and wherein the loading, determining, and displaying are performed by one or more computers.

9. The system of claim 8, the at least one processor further configured to:
   determine a time spent viewing the presentation by the account; and
   display the time spent viewing the presentation in association with the account in the insights tab.

10. The system of claim 8, the at least one processor further configured to:
    determine a number of slides in the presentation viewed by the account; and
    display the number of slides viewed with the account in the insights tab.

11. The system of claim 8, the at least one processor further configured to:
    determine a last activity time for the account indicating the date and time that the account viewed the presentation; and
    display the last activity time in association with the account in the insights tab.

12. The system of claim 8, the at least one processor further configured to:
    determine a total number of comments for the account on the presentation; and
    display the total number of comments in association with the account in the insights tab.

13. The system of claim 8, the at least one processor further configured to:
    display a trend indicator in the insights tab, wherein the trend indicator provides in graphical form an indication of user engagement over a time period.

14. The system of claim 8, wherein the summary panel further comprises:
    a number of views and a number of comments,
    wherein the number of views is the cumulative total of views of the presentation,
    and
    wherein the number of comments is the cumulative total of comments entered in the presentation.

15. A non-transitory computer-readable device having instructions stored thereon that, when executed by at least one computing device, causes the at least one computing device to perform operations comprising:
    loading a presentation in a cloud collaboration platform and an account associated with the presentation, wherein the presentation comprises a slide, and wherein the slide comprises a content and an account comment;
    determining a view status for the slide, a comment status for the slide, a total number of comments on the presentation, and a percentage of engagement, wherein the view status indicates that an account viewed the slide, wherein the comment status indicates that the account commented on the slide; and
    displaying the presentation with an insights tab, wherein the insights tab displays the account, a thumbnail representation for the slide, the percentage of engagement, and a summary panel comprising a number of edits, wherein the number of edits is the cumulative total of edits made in the presentation, and wherein the thumbnail representation includes the view status and the comment status, and wherein the loading, determining, and displaying are performed by one or more computers.

16. The non-transitory computer-readable device of claim 15, the operations further comprising:
    determining a time spent viewing the presentation by the account; and
    displaying the time spent viewing the presentation in association with the account in the insights tab.

17. The non-transitory computer-readable device of claim 15, the operations further comprising:
    determining a number of slides in the presentation viewed by the account; and
    displaying the number of slides viewed with the account in the insights tab.

18. The non-transitory computer-readable device of claim 15, the operations further comprising:
    determining a last activity time for the account indicating the date and time that the account viewed the presentation; and
    displaying the last activity time in association with the account in the insights tab.

19. The non-transitory computer-readable device of claim 15, the operations further comprising:
    determining a total number of comments for the account on the presentation; and
    displaying the total number of comments in association with the account in the insights tab.

20. The non-transitory computer-readable device of claim 15, the operations further comprising:
    displaying a trend indicator in the insights tab, wherein the trend indicator provides in graphical form an indication of user engagement over a time period.

* * * * *